(12) United States Patent
Kuriyama et al.

(10) Patent No.: US 11,646,772 B2
(45) Date of Patent: *May 9, 2023

(54) WIRELESS COMMUNICATION SYSTEM, WIRELESS COMMUNICATION METHOD, TRANSMITTING STATION DEVICE AND RECEIVING STATION DEVICE

(71) Applicant: NIPPON TELEGRAPH AND TELEPHONE CORPORATION, Tokyo (JP)

(72) Inventors: Keita Kuriyama, Musashino (JP); Hayato Fukuzono, Musashino (JP); Tsutomu Tatsuta, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 37 days.

This patent is subject to a terminal disclaimer.

(21) Appl. No.: 17/433,475

(22) PCT Filed: Feb. 19, 2020

(86) PCT No.: PCT/JP2020/006548
§ 371 (c)(1),
(2) Date: Aug. 24, 2021

(87) PCT Pub. No.: WO2020/175280
PCT Pub. Date: Sep. 3, 2020

(65) Prior Publication Data
US 2022/0140866 A1    May 5, 2022

(30) Foreign Application Priority Data
Feb. 26, 2019 (JP) .............................. JP2019-033362

(51) Int. Cl.
*H03H 7/30* (2006.01)
*H04B 7/0417* (2017.01)
*H04B 7/005* (2006.01)

(52) U.S. Cl.
CPC .......... *H04B 7/0417* (2013.01); *H04B 7/005* (2013.01)

(58) Field of Classification Search
CPC .............................. H04B 7/0417; H04B 7/005
(Continued)

(56) References Cited

U.S. PATENT DOCUMENTS

2008/0117997 A1* 5/2008 Maltsev .............. H04L 25/0248
375/267
2015/0358103 A1  12/2015 Ohwatari et al.
2019/0222246 A1  7/2019 Takahashi et al.

FOREIGN PATENT DOCUMENTS

WO    WO-2014115374 A1    7/2014
WO    WO-2018073851 A1    4/2018

OTHER PUBLICATIONS

Keita Kuriyama et al., FIR-type Transmit Beamforming for Wideband Single Carrier MIMO Transmission, IEICE Technical Report, vol. 118, No. 435, 2019, pp. 31-36.

* cited by examiner

*Primary Examiner* — Zewdu A Kassa (57) ABSTRACT

A transmitting station apparatus includes a training signal generation unit, a transmission end linear equalization unit configured to equalize data signals by a transmission end transfer function, and a transmitting station communication unit configured to transmit a training signal or a plurality of data signals and receive information of the transmission end transfer function from a receiving station apparatus. The receiving station apparatus includes a communication path estimation unit configured to estimate a communication path (Continued)

response from the training signal, a reception end coefficient calculation unit configured to calculate the transmission end transfer function with an adjugate matrix of a transfer function matrix H of the communication path response as a transfer function and a reception end transfer function with an inverse of a determinant of the transfer function matrix H as a transfer function, and a reception end linear equalization unit configured to equalize reception signals by using the reception end transfer function. The reception end linear equalization unit determines whether the determinant of the transfer function matrix H is a minimum phase, performs a forward direction equalization in a case of the minimum phase, and performs an inverse direction equalization in a case of a non-minimum phase.

6 Claims, 6 Drawing Sheets

(58) Field of Classification Search
USPC ............... 375/231, 230, 229, 219, 316, 295
See application file for complete search history.

WIRELESS COMMUNICATION SYSTEM, WIRELESS COMMUNICATION METHOD, TRANSMITTING STATION DEVICE AND RECEIVING STATION DEVICE

CROSS-REFERENCE TO RELATED APPLICATIONS

This application is a 371 U.S. National Phase of International Application No. PCT/JP2020/006548 filed on Feb. 19, 2020, which claims priority to Japanese Application No. 2019-033362 filed on Feb. 26, 2019. The entire disclosures of the above applications are incorporated herein by reference.

TECHNICAL FIELD

The present invention relates to a technology of a time domain linear equalization unit for suppressing inter-antenna interference and inter-symbol interference in a wireless communication system that performs single carrier multiple-input multiple-output (SC-MIMO) transmission.

BACKGROUND ART

Broadband SC-MIMO transmission in a communication environment where frequency-selective fading occurs requires processing of suppressing inter-antenna interference (IAI) caused by a spatial extent of a plurality of antennas and inter-symbol interference (ISI) caused by a temporal extent of communication path characteristics.

Thus, a method for simultaneously equalizing the IAI/ISI with low processing delay has been studied by performing transmission beam formation in the time/spatial direction by using a time domain linear equalization unit (for example, see NPL 1).

CITATION LIST

Non Patent Literature

NPL 1: Keita Kuriyama, Hayato Fukuzono, Masafumi Yoshioka, Tsutomu Tatsuta, "FIR-type Transmit Beamforming for Wide-band Single Carrier MIMO Transmission" IEICE Technical Report, vol. 118, no. 435, RCS2018-247, pp. 31-36, January, 2019.

SUMMARY OF THE INVENTION

Technical Problem

However, as in NPL 1, in a technique in which an inverse matrix $H^{-1}(z)$ of a transfer function matrix $H(z)$ of a CIR is used for a transfer function of a linear equalization unit, there is a problem in that it cannot be applied in a case where a part of transfer functions becomes a non-minimum phase during the process of calculating the transfer function of the equalization unit. Here, the transfer function becomes a minimum phase in a case where the zero assignment of the transfer function is distributed within a unit circle, and the transfer function becomes a non-minimum phase in a case where the zero assignment of the transfer function is distributed out of the unit circle. In the case of a non-minimum phase, the operation of the equalization unit may become unstable and the impulse response may diverge, leading to the problem that it cannot be applied to a case where a part of the transfer function of the equalization unit becomes a non-minimum phase.

An object of the present invention is to provide a wireless communication system, a wireless communication method, a transmitting station apparatus, and a receiving station apparatus which enable, by determining whether each transfer function of an equalization unit is a minimum phase or a non-minimum phase in SC-MIMO transmission and changing an equalization direction accordingly, stable operation and equalization of IAI and ISI even in a case where a part of transfer functions of the equalization unit is a non-minimum phase.

Means for Solving the Problem

A first invention is a wireless communication system configured to perform SC-MIMO transmission between a transmitting station apparatus and a receiving station apparatus, in which the transmitting station apparatus includes a training signal generation unit configured to generate a training signal that is known, a transmission end linear equalization unit configured to output a plurality of second data signals obtained by equalizing a plurality of first data signals by using a transmission end transfer function, and a transmitting station communication unit including a plurality of antennas configured to transmit the training signal or the plurality of second data signals to the receiving station apparatus and receive information on the transmission end transfer function from the receiving station apparatus, the receiving station apparatus includes a receiving station communication unit including a plurality of antennas configured to receive the plurality of second data signals or the training signal transmitted by the transmitting station apparatus and transmit the information on the transmission end transfer function to the transmitting station apparatus, a communication path estimation unit configured to estimate a communication path response from the training signal received by the receiving station communication unit, a reception end coefficient calculation unit configured to calculate the transmission end transfer function with an adjugate matrix of a transfer function matrix H of the communication path response as a transfer function and a reception end transfer function with an inverse of a determinant of the transfer function matrix H as a transfer function, and a reception end linear equalization unit configured to output a plurality of third data signals obtained by equalizing the plurality of second data signals received by the receiving station communication unit by using the reception end transfer function, and the reception end linear equalization unit determines whether the determinant of the transfer function matrix H is a minimum phase, performs a forward direction equalization in a case of the minimum phase, and performs an inverse direction equalization in a case of a non-minimum phase.

In a second invention, in the first invention, the reception end coefficient calculation unit calculates only the reception end transfer function with the inverse of the determinant of the transfer function matrix H as a transfer function, and transmits information on the communication path response to the transmitting station apparatus, and the transmitting station apparatus further includes a transmission end coefficient calculation unit configured to calculate, based on the information on the communication path response received from the receiving station apparatus, the transmission end transfer function with the adjugate matrix of the transfer function matrix H of the communication path response as a transfer function.

A third invention is a wireless communication method for performing SC-MIMO transmission between a transmitting station apparatus and a receiving station apparatus, the wireless communication method including the steps of by the transmitting station apparatus, generating a training signal that is known, by the transmitting station apparatus, outputting a plurality of second data signals obtained by equalizing a plurality of first data signals by using a transmission end transfer function, by the transmitting station apparatus, transmitting the training signal or the plurality of second data signals to the receiving station apparatus and receiving information on the transmission end transfer function from the receiving station apparatus, by the receiving station apparatus, receiving the plurality of second data signals or the training signal transmitted by the transmitting station apparatus and transmitting the information on the transmission end transfer function to the transmitting station apparatus, by the receiving station apparatus, estimating a communication path response from the training signal received from the transmitting station apparatus, by the receiving station apparatus, calculating the transmission end transfer function with an adjugate matrix of a transfer function matrix H of the communication path response as a transfer function and a reception end transfer function with an inverse of a determinant of the transfer function matrix H as a transfer function, and by the receiving station apparatus, outputting a plurality of third data signals obtained by equalizing the plurality of second data signals that are received by using the reception end transfer function, in which the outputting step by the receiving station apparatus determines whether the determinant of the transfer function matrix H is a minimum phase, performs a forward direction equalization in a case of the minimum phase, and performs an inverse direction equalization in a case of a non-minimum phase.

In a fourth invention, in the third invention, the calculating step by the receiving station apparatus calculates only the reception end transfer function with the inverse of the determinant of the transfer function matrix H as a transfer function, and transmits information on the communication path response to the transmitting station apparatus, and the transmitting station apparatus further performs calculating, based on the information on the communication path response received from the receiving station apparatus, the transmission end transfer function with the adjugate matrix of the transfer function matrix H of the communication path response as a transfer function.

A fifth invention is a transmitting station apparatus configured to perform SC-MIMO transmission with a receiving station apparatus, the transmitting station apparatus including a training signal generation unit configured to generate a training signal that is known for the receiving station apparatus to estimate a communication path response, a transmission end linear equalization unit configured to output a plurality of second data signals obtained by equalizing a plurality of first data signals by using a transmission end transfer function with an adjugate matrix of a transfer function matrix H of the communication path response as a transfer function, and a transmitting station communication unit including a plurality of antennas configured to transmit the training signal or the plurality of second data signals to the receiving station apparatus and receive information on the transmission end transfer function from the receiving station apparatus.

In a sixth invention, in the fifth invention, the transmitting station apparatus further includes a transmission end coefficient calculation unit configured to calculate, based on the information on the communication path response received from the receiving station apparatus, the transmission end transfer function with the adjugate matrix of the transfer function matrix H of the communication path response as a transfer function.

A seventh invention is a receiving station apparatus configured to perform SC-MIMO transmission with a transmitting station apparatus, the receiving station apparatus including a receiving station communication unit including a plurality of antennas configured to receive a plurality of second data signals or a training signal transmitted by the transmitting station apparatus and transmit information on a transmission end transfer function used by an equalization unit of the transmitting station apparatus to the transmitting station apparatus, a communication path estimation unit configured to estimate a communication path response from the training signal received by the receiving station communication unit, a reception end coefficient calculation unit configured to calculate the transmission end transfer function with an adjugate matrix of a transfer function matrix H of the communication path response as a transfer function and a reception end transfer function with an inverse of a determinant of the transfer function matrix H as a transfer function, and a reception end linear equalization unit configured to output a plurality of third data signals obtained by equalizing the plurality of second data signals received by the receiving station communication unit by using the reception end transfer function, in which the reception end linear equalization unit determines whether the determinant of the transfer function matrix H is a minimum phase, performs a forward direction equalization in a case of the minimum phase, and performs an inverse direction equalization in a case of a non-minimum phase.

In an eighth invention, in the seventh invention, the reception end coefficient calculation unit calculates only the reception end transfer function with the inverse of the determinant of the transfer function matrix H as a transfer function, and transmits information on the communication path response to the transmitting station apparatus.

Effects of the Invention

The wireless communication system, the wireless communication method, the transmitting station apparatus, and the receiving station apparatus according to the present invention enable, by determining whether each transfer function of an equalization unit is a minimum phase or a non-minimum phase in SC-MIMO transmission and changing an equalization direction accordingly, stable operation and equalization of IAI and ISI even in a case where a part of transfer functions of the equalization unit is a non-minimum phase.

DESCRIPTION OF EMBODIMENTS

Hereinafter, embodiments of a wireless communication system, a wireless communication method, a transmitting station apparatus, and a receiving station apparatus according to the present invention will be described with reference to the drawings.

Figure 1:
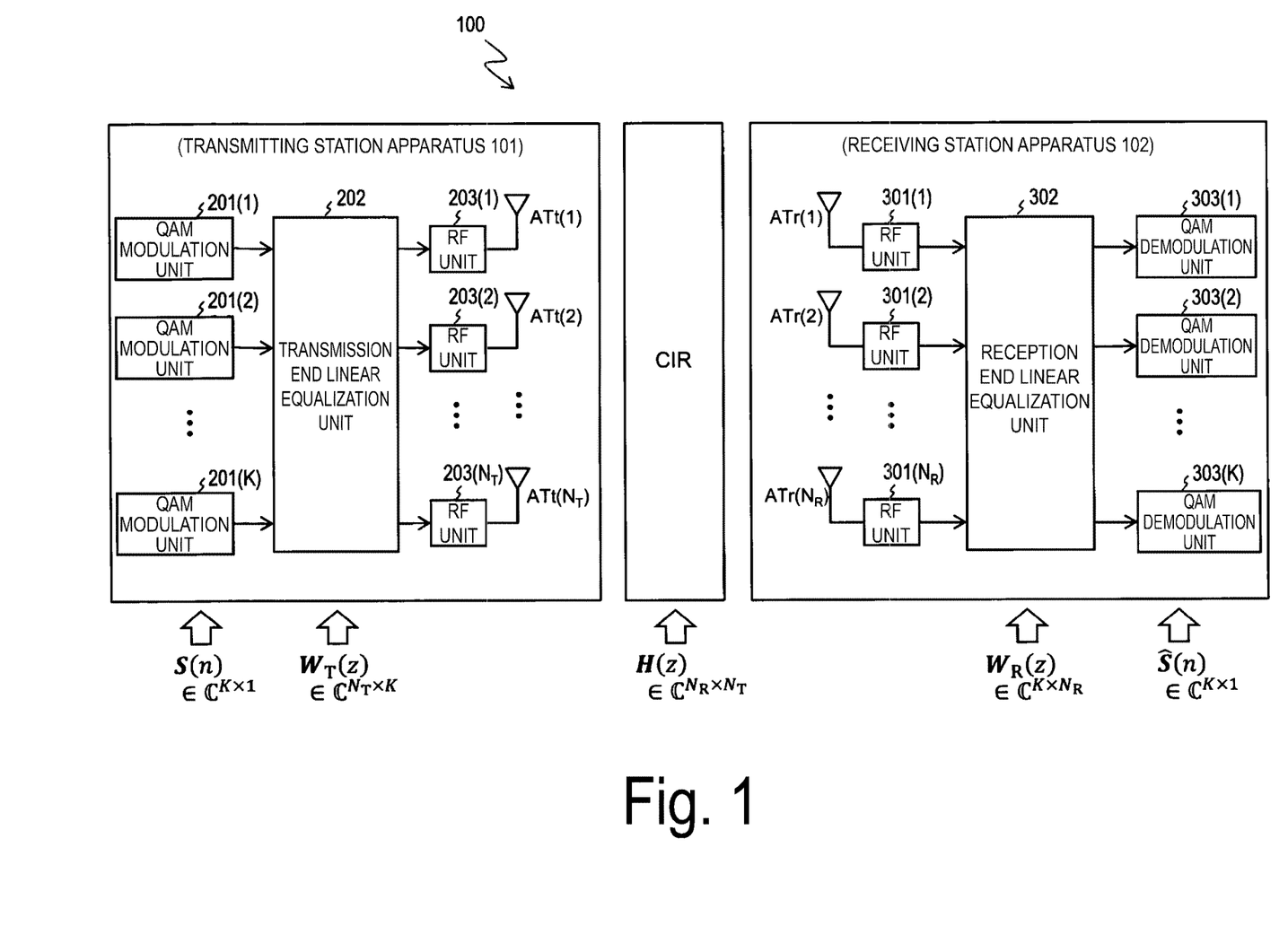
FIG. 1 is a diagram illustrating an example of a wireless communication system according to a first embodiment and a second embodiment.

FIG. 1 illustrates an example of a wireless communication system 100 according to a first embodiment and a second embodiment. In FIG. 1, the wireless communication system 100 includes a transmitting station apparatus 101 including a plurality of ($N_T$: $N_T$ is an integer of two or more ($N_T \geq 2$)) antennas from an antenna ATt (1) to an antenna ATt ($N_T$) and a receiving station apparatus 102 including a plurality of ($N_R$: $N_R$ is an integer of two or more ($N_R \geq 2$)) antennas from an antenna ATr (1) to an antenna ATr ($N_R$), and performs wireless communication between the transmitting station apparatus 101 and the receiving station apparatus 102. Here, in the following description, the antenna ATt (1) to the antenna ATt ($N_T$) of the transmitting station apparatus 101 each are referred to as "antenna ATt" with the numeral in parentheses at the end of the symbol being omitted when a common description among these antennas is given. In contrast, when a specific antenna is described, the antenna is referred to as, for example, "antenna ATt (1)" with the numeral in parentheses added to the end of the symbol. This similarly applies to the antenna ATr (1) to the antenna ATr ($N_R$) of the receiving station apparatus 102. This similarly applies also to a case where a plurality of identical blocks are provided.

The wireless communication system 100 according to the present embodiment performs a wireless communication of broadband SC-MIMO scheme using a plurality of antennas between the transmitting station apparatus 101 and the receiving station apparatus 102. Here, a plurality of delay waves with different delay times, as in multipath propagation, are present in the wireless communication path between the transmitting station apparatus 101 and the receiving station apparatus 102, causing frequency-selective fading. For this reason, inter-symbol interference (ISI) caused by communication path characteristics and inter-antenna interference (IAI) need to be suppressed. In the example of FIG. 1, inter-antenna interference (IAI) due to spatial extent occurs between the $N_T$ antennas in the transmitting station apparatus 101 and the $N_R$ antennas in the receiving station apparatus 102. Signals transmitted and received between the antennas of the transmitting station apparatus 101 and the antennas of the receiving station apparatus 102 are affected by inter-symbol interference (ISI) caused by temporal extent. Here, when a communication path response (CIR) of the wireless communication path between the transmitting station apparatus 101 and the receiving station apparatus 102 is H(z), the communication path response H(z) can be represented by a matrix of a transfer function (referred to as a transfer function matrix) that uses $N_T * N_R$ as an element in accordance with the number of the plurality of antennas.

In FIG. 1, the transmitting station apparatus 101 includes quadrature amplitude modulation (QAM) modulation units 201, a transmission end linear equalization unit 202, RF units 203, and antennas ATt.

The QAM modulation units 201 output a data signal S(n) (referred to as a transmission data signal) obtained by performing quadrature amplitude modulation (QAM) on a bit sequence of data information bits to be transmitted to the receiving station apparatus 102. Note that the QAM modulation units 201 include a QAM modulation unit 201 (1) to a QAM modulation unit 201 (K) (K: K is an integer equal to or greater than 1 (K≥1)), and output a data signal S(n) corresponding to K streams. Here, the data signal S(n) is a matrix with K*1 as an element.

The transmission end linear equalization unit 202 performs equalization processing by a transfer function matrix $W_T(z)$ on the transmission end calculated on the basis of the CIR between the transmitting station apparatus 101 and the receiving station apparatus 102. The transfer function matrix $W_T(z)$ is a matrix with $N_T * K$ transfer functions as elements. Note that the processing for normalizing a transmission power is also performed at the same time as the equalization processing. Here, in the present embodiment, the transmission end linear equalization unit 202 equalizes IAI by transmission beam forming. The transmission end linear equalization unit 202 can be implemented by an equalization unit of a finite impulse response (FIR) type that has a delay tap holding the data signal output by the QAM modulation unit 201, for example, and shifting the data signal every fixed time, and outputs a sum of signals obtained by multiplying respective delay tap signals by predetermined tap coefficients. Here, the transfer function matrix for the IAI equalization is calculated on the basis of the CIR estimated by the receiving station apparatus 102 by a training signal transmitted from the transmitting station apparatus 101.

The RF units 203 include $N_T$ RF units of an RF unit 203 (1) to an RF unit 203 ($N_T$) corresponding to the respective $N_T$ antennas ATt, and frequency-convert the data signals obtained by equalizing IAI or the training signal output by the transmission end linear equalization unit 202 to high-frequency transmission signals, and transmit the result from the antennas ATt for respective streams.

The antennas ATt include the $N_T$ transmission and reception antennas of the antenna ATt (1) to the antenna ATt ($N_T$) and emit high-frequency signals output by the RF units 203 as electromagnetic waves to the space.

In this manner, the transmitting station apparatus 101 can transmit transmission signals obtained by equalizing IAI to the receiving station apparatus 102.

In FIG. 1, the receiving station apparatus 102 includes antennas ATr, RF units 301, a reception end linear equalization unit 302, and QAM demodulation units 303.

The antennas ATr include $N_R$ transmission and reception antennas of an antenna ATr (1) to an antenna ATr ($N_R$), and convert electromagnetic waves in the space transmitted from the transmitting station apparatus 101 into high-frequency signals.

The RF units 301 include $N_R$ RF units of an RF unit 301 (1) to an RF unit 301 ($N_R$) corresponding to the respective $N_R$ antennas ATr, and frequency-convert high-frequency signals output by the antenna ATr (1) to the antenna ATr ($N_R$) to baseband signals.

The reception end linear equalization unit 302 performs equalization processing by a transfer function matrix $W_R(z)$ on the reception end calculated on the basis of the CIR between the transmitting station apparatus 101 and the receiving station apparatus 102. The transfer function matrix $W_R(z)$ is a matrix with $K*N_R$ transfer functions as elements. Here, the transfer function matrix $W_R(z)$ is calculated on the basis of the CIR estimated by the receiving station apparatus 102 by a training signal transmitted from the transmitting station apparatus 101, and equalizes the ISI. In particular, in the present embodiment, because the inverse matrix $H^{-1}(z)$ of the transfer function matrix H(z) of the CIR is used for the transfer function of the linear equalization unit, the reception end linear equalization unit 302 determines whether each transfer function of the transfer function matrix $W_R(z)$ is the minimum phase or non-minimum phase, and in the case of the minimum phase, performs control with the equalization direction of the equalization unit as the forward direction, and in the case of the non-minimum phase, performs control with an equalization direction of the equalization unit as the inverse direction, as described below.

The QAM demodulation units 303 demodulate data signals $\hat{S}(n)$ of K streams obtained by equalizing the ISI output by the reception end linear equalization unit 302 to information bits, and output a bit sequence. Note that because the reception end linear equalization unit 302 outputs data signals $\hat{S}(n)$ of $N_R$ streams according to the number of antennas ATr, the QAM demodulation units 303 demodulate the data signals $\hat{S}(n)$ for respective streams.

In this manner, the receiving station apparatus 102 may equalize the ISI from the signals received at the $N_R$ antennas ATr and demodulate the data signals.

Note that the receiving station apparatus 102 estimates the CIR from the training signal transmitted from the transmitting station apparatus 101, and the receiving station apparatus 102 calculates the transfer function matrix for the ISI equalization. As described below, the transfer function matrix used by the linear transmission end linear equalization unit 202 may be calculated on the receiving station apparatus 102 end and transmitted to the transmitting station apparatus 101 end, or the CIR information may be transmitted from the receiving station apparatus 102 end to the transmitting station apparatus 101 end to calculate the transfer function matrix on the transmitting station apparatus 101 end.

In FIG. 1, when the data signal output by the QAM modulation units 201 is denoted by S(n), the transfer function matrix of the transmission end linear equalization unit 202 is denoted by $W_T(Z)$, the transfer function matrix of the CIR is denoted by H(Z), the transfer function matrix of the reception end linear equalization unit 302 is denoted by $W_R(Z)$, the data signal output by the QAM demodulation units 303 is $\hat{S}(n)$, and the added noise is denoted by $\eta(n)$, the relationship between the signals transmitted and received in the wireless communication system 100 according to the present embodiment can be expressed by Equation (1).

[Math. 1]

$$\hat{S}(n) = \quad (1)$$
$$W_R(z)\{H(z)W_T(z)S(n) + \eta(n)\} = W_R(z)H(z)W_T(z)S(n) + W_R(z)\eta(n)$$

Here, S(n), $W_T(Z)$, H(Z), $W_R(Z)$, $\hat{S}(n)$, and $\eta(n)$ are as follows.

$S(n) \in \mathbb{C}^{K \times 1}$ $W_T(z) \in \mathbb{C}^{N_T \times K}$ $H(z) \in \mathbb{C}^{N_R \times N_T}$ $W_R(z) \in \mathbb{C}^{K \times N_R}$ $\hat{S}(n) \in \mathbb{C}^{K \times 1}$ $\eta(n) \in \mathbb{C}^{N_R \times 1}$ Note that $\mathbb{C}$ represents a set of elements of the matrix, for example, $\mathbb{C}^{K+1}$ has (K+1) elements. Here, K is the number of streams of the data signals (where, $K=N_T$).

In Equation (1), the transfer function matrix H(z) of the CIR is expressed by Equation (2).

[Math. 3]

$$H(z) = \begin{bmatrix} H_{11}(z) & \cdots & H_{1N_T}(z) \\ \vdots & \ddots & \vdots \\ H_{N_R1}(z) & \cdots & H_{N_RN_T}(z) \end{bmatrix} \quad (2)$$

Here, the transfer function $H_{n_rn_t}(z)$ for each element of the transfer function matrix H(z) is represented by Equation (3). Note that $n_r$ is an integer of $1 \leq n_r \leq N_R$ and $n_t$ is an integer of $1 \leq n_t \leq N_T$. Subscripts $n_r$ and $n_t$ of the symbols H and h in Equation (3), in the description of this document, are denoted as nr and nt as in $H_{nrnt}(z)$. This similarly applies to subscripts for other symbols.

[Math. 4]

$$H_{n_rn_t}(z) = \sum_{l=0}^{L-1} h_{n_rn_t}^{(l)} z^{-l} \quad (3)$$

Here, $Z^{-1}$ is a delay element of the transfer function, $h^{(l)}_{nrnt}$ is the CIR for a l-th path between the $n_r$-th reception antenna and the $n_t$-th transmission antenna. l is an integer of $0 \leq l \leq L-1$ (L is a positive integer) and indicates a path number in the number of paths L. Note that the number of paths L indicates the number of multipaths or the like.

The transfer function matrix $W_T(z)$ of the transmission end linear equalization unit 202 of the transmitting station apparatus 101 is represented by Equation (4).

[Math. 5]

$$W_T(z) = \begin{bmatrix} W_{T,11}(z) & \cdots & W_{T,1K}(z) \\ \vdots & \ddots & \vdots \\ W_{T,N_T1}(z) & \cdots & W_{T,N_TK}(z) \end{bmatrix} \quad (4)$$

Here, the transfer function $W_{T,n_tk}(z)$ for each element of the transfer function matrix $W_T(z)$ is represented by Equation (5). Note that $W^{(p)}_{T,n_tk}$ indicates the p-th tap coefficient of the transmission end linear equalization unit 202 that receives the data signal for the k-th stream (k is an integer of $1 \leq k \leq K$) and outputs a signal to the $n_t$-th transmission antenna. p is an integer of $0 \leq p \leq P-1$ (P is a positive integer), and indicates a tap number in the number of taps P of the transmission end linear equalization unit 202.

[Math. 6]

$$W_{T,n_tk}(z) = \sum_{p=0}^{P-1} w^{(p)}_{T,n_tk} z^{-p} \quad (5)$$

The transfer function matrix $W_R(z)$ of the reception end linear equalization unit 302 of the receiving station apparatus 102 is represented by Equation (6).

[Math. 7]

$$W_R(z) = \begin{bmatrix} W_{R,1}(z) & \cdots & 0 \\ \vdots & \ddots & \vdots \\ 0 & \cdots & W_{R,N_R}(z) \end{bmatrix} \quad (6)$$

Here, the transfer function $W_{R,n_r}(z)$ for each element of the transfer function matrix $W_R(z)$ is represented by Equation (7). Note that $W^{(q)}_{R,n_r}$ indicates the q-th tap coefficient of the reception end linear equalization unit 302 that receives the signal of the $n_r$-th reception antenna and performs the equalization processing. q is an integer of $0 \leq q \leq Q-1$ (Q is a positive integer), and indicates a tap number in the number of taps Q of the reception end linear equalization unit 302.

[Math. 8]

$$W_{R,n_r}(z) = \sum_{q=0}^{Q-1} w^{(q)}_{R,n_r} z^{-q} \quad (7)$$

Calculation of Transfer Functions of Transmission End Linear Equalization Unit 202 and Reception End Linear Equalization Unit 302

Next, the calculation of the transfer function matrix of the transmission end linear equalization unit 202 and the reception end linear equalization unit 302 in the zero-forcing reference will be described.

In the present embodiment, because the equalization of the CIR (H(z)) is performed separately by the transmitting station apparatus 101 and the receiving station apparatus 102, as shown in Equation (8), a matrix obtained by multiplying the transfer function matrix $W_T(z)$ of the transmission end linear equalization unit 202 and the transfer function matrix $W_R(z)$ of the reception end linear equalization unit 302 is the inverse matrix $H^{-1}(z)$ of the transfer function matrix $H(z)$ of the CIR. Here, $H^{-1}(z)$ can be expressed in terms of a product of a transfer function of $1/\det(H(z))$ and a matrix of $adj(H(z))$.

[Math. 9]

$$W_R(z)W_T(z) = H^{-1}(z) = \frac{1}{\det(H(z))} adj(H(z)) \quad (8)$$

Here, det(•) and adj(•) represent a determinant and an adjugate matrix, respectively. Note that adj is different from an adjoint matrix that represents an Hermitian transpose.

In Equation (8), the adjugate matrix of the transfer function matrix $H(z)$ of the communication path response is defined as a transfer function matrix, and the transfer function matrix $W_T(z)$ of the transmission end linear equalization unit 202 is defined as Equation (9).

[Math. 10]

$$W_T(z) = adj(H(z)) \in \mathbb{C}^{N_T \times K} \quad (9)$$

In Equation (8), the inverse of the determinant of the transfer function matrix H(z) of the communication path response is defined as a transfer function matrix, and the transfer function matrix $W_R(z)$ of the reception end linear equalization unit 302 is defined as Equation (10).

[Math. 11]

$$W_R(z) = \frac{1}{\det(H(z))} I \in \mathbb{C}^{K \times N_R} \quad (10)$$

Here, I is a unit matrix.

By multiplying the transfer function matrix $W_T(Z)$ and the transfer function matrix $W_R(Z)$ of the linear equalization unit as described above, the input/output relationship of the signal becomes like Equation (11), and demodulation of the data signal S(n) is possible.

[Math. 12]

$$\hat{S}(n) = W_R(z)H(z)W_T(z)S(n) = S(n) \quad (11)$$

In this manner, in the wireless communication system 100 according to the present embodiment, the transmission end linear equalization unit 202 and the reception end linear equalization unit 302 can separately multiply the inverse matrix $H^{-1}(z)$ of the transfer function matrix H(z) of the CIR, and perform equalization of the IAI and ISI by the time domain linear equalization unit.

Here, in an approach in which the inverse matrix $H^{-1}(z)$ of the transfer function matrix H(z) of the CIR is used for the transfer function of the linear equalization unit, there is a problem that the coefficients diverge when a part of the transfer functions is a non-minimum phase in the transfer function calculation process, and the equalization unit cannot be applied.

Equation (12) corresponds to Equation (8) and shows a transfer function matrix w(Z) for equalization of the overall wireless communication system 100.

[Math. 13]

$$W(z) = \frac{1}{\det(H(z))} adj(H(z)) \quad (12)$$

In Equation (12), 1/det (H(z)) constitutes an IIR type equalization unit, as shown in Equation (13), but can be approximated in an FIR type equalization unit by using an infinite series, as shown in Equation (14). Here, $a^{(i)}$ (i is an integer of $0 \leq i \leq L-1$) corresponds to a coefficient of det (H(z)).

[Math. 14]

$$\frac{1}{\det(H(z))} = \frac{1}{a^{(0)} + a^{(1)}z^{-1} + \ldots + a^{(L-1)}z^{-L+1}} \quad (13)$$

[Math. 15]

$$\frac{1}{\det(H(z))} = \frac{1}{a^{(0)}} \sum_{j=0}^{\infty} \left( -\sum_{i=1}^{N(L-1)} \frac{a^{(i)}}{a^{(0)}} z^{-i} \right)^j \quad (14)$$

However, to approximate Equation (13) with Equation (14) to apply an FIR type equalization unit, there is a condition that 1/det (H(z)) be stable. Thus, in the present embodiment, the applicability of the FIR type equalization unit is determined by the condition of the determinant det (H(z)) of the transfer function matrix H(z).

In a case where det (H(z)) is the minimum phase: applicable

In a case where det (H(z)) is a non-minimum phase: not-applicable (equalization unit coefficient is diverging)

Figure 2:
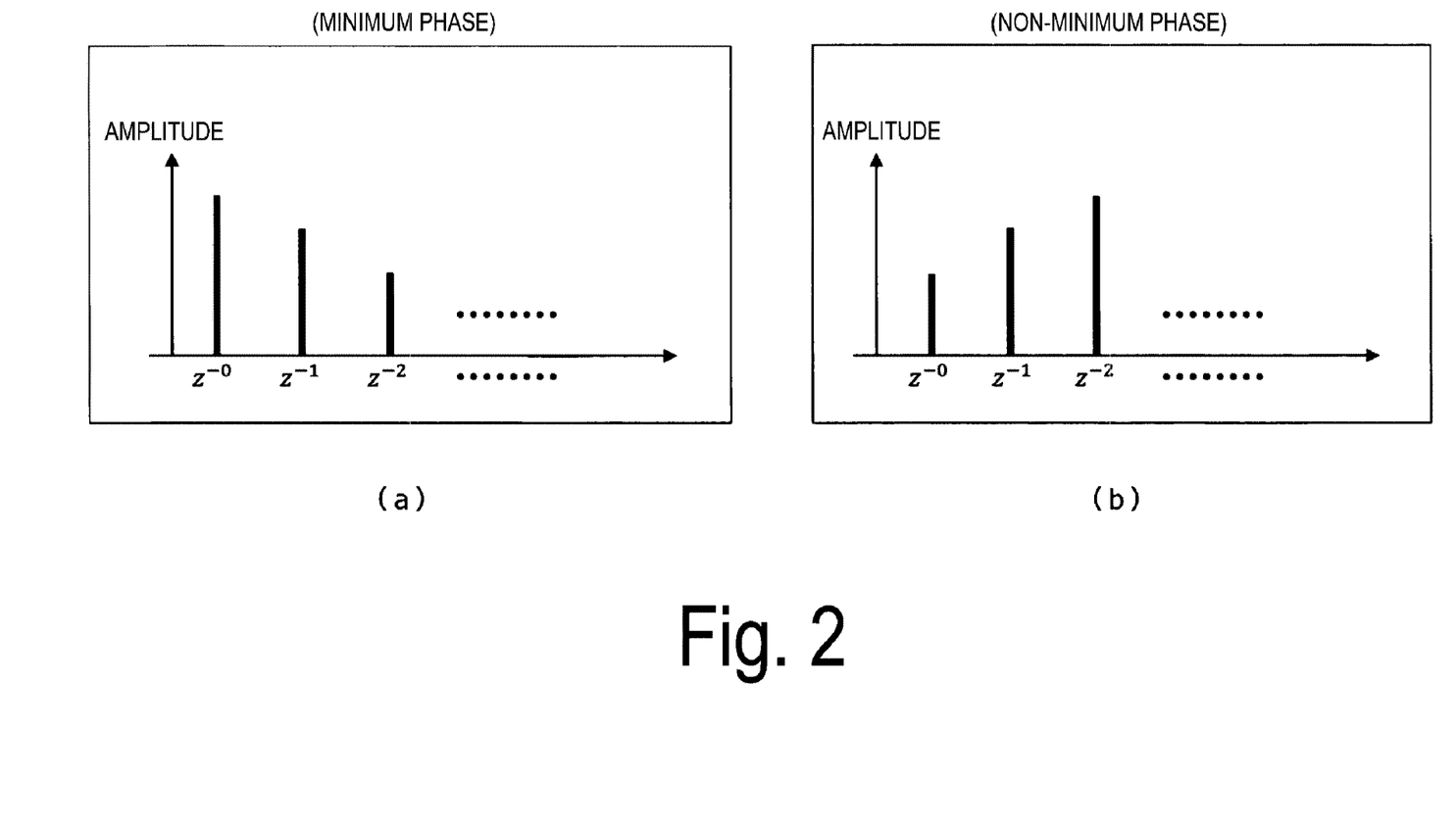
FIG. 2 is a diagram illustrating an example of an impulse response of 1/det (H(z)).

FIG. 2 illustrates an example of an impulse response of 1/det (H(z)). In FIG. 2, the horizontal axis indicates the time corresponding to the delay tap ($Z^{-0}, Z^{-1}, Z^{-2}, \ldots$) of the FIR type equalization unit, and the vertical axis indicates the amplitude of the signal held at each delay tap. FIG. 2(a) illustrates the amplitude of each delay tap in a case where det (H(z)) is the minimum phase, and FIG. 2(b) illustrates the amplitude of each delay tap in a case where det (H(z)) is a non-minimum phase.

In FIG. 2(a), in a case where det (H(z)) is the minimum phase, the amplitude of the signal of the delay tap becomes smaller, and the impulse response of det (H(z)) converges and can be approximated to 0 in the FIR type, so that the operation of the equalization unit is stable. On the other hand, in FIG. 2(b), in a case where det (H(z)) is a non-minimum phase, the amplitude of the signal of the delay tap becomes larger, and the impulse response of det (H(z)) diverges, so that the operation of the equalization unit is unstable, and the FIR type equalization unit is difficult to apply.

Figure 3:
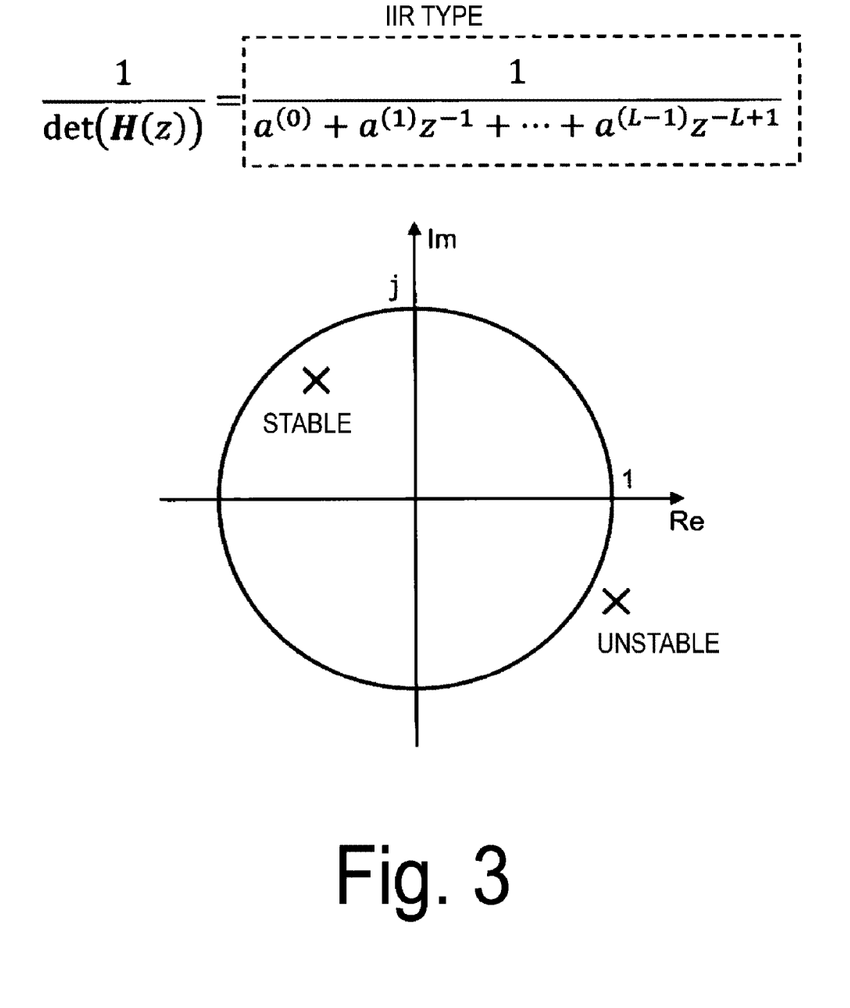
FIG. 3 is a diagram illustrating an example of a position of a pole of 1/det (H(z)).

FIG. 3 illustrates an example of a position of a pole of 1/det (H(z)). In FIG. 3, the pole of 1/det (H(z)) illustrated in Equation (13) is stable when in a unit circle, excluding the circumference, on the Z plane, with the real axis Re and the imaginary axis Im, but unstable when outside of a unit circle, excluding the circumference, on the complex Z plane, and the impulse response diverges. Here, the pole corresponds to the root of the polynomial of the denominator of Equation (13).

Method for Determining Minimum Phase/Non-Minimum Phase

The following two methods are envisioned as a method for determining the minimum phase and the non-minimum phase.

Method 1

In Method 1, in a case where det (H(z)) is represented by Equation (15), in i={1, . . . , N (L−1)}, the minimum phase is given when Relationship (16) is satisfied. Here, N is the number of antennas and L is the number of delay paths.

[Math. 16]

$$\det(H(z)) = \sum_{i=0}^{N(L-1)} a^{(i)} z^{-i} \quad (15)$$

[Math. 17]

$$\left| \frac{a^{(i)}}{a^{(0)}} \right| < 1 \quad (16)$$

Then, in a case where Equation (16) is not satisfied, and there is one or more $a^{(i)}$ by which the left hand side is equal to or greater than one, as in Relationship (17), det (H(z)) is determined to be a non-minimum phase.

[Math. 18]

$$\left| \frac{a^{(i)}}{a^{(0)}} \right| \geq 1 \quad (17)$$

Method 2

In Method 2, as described in FIG. 3, for Equation (15), in a case where all zero points are within the unit circle on the complex Z plane, then det (H(z)) is determined to be a minimum phase.

Processing for Non-Minimum Phase

In the wireless communication system 100 according to the present embodiment, the direction of the equalization unit is switched to the inverse direction when a non-minimum phase is determined by either of the methods described above.

Figure 4:
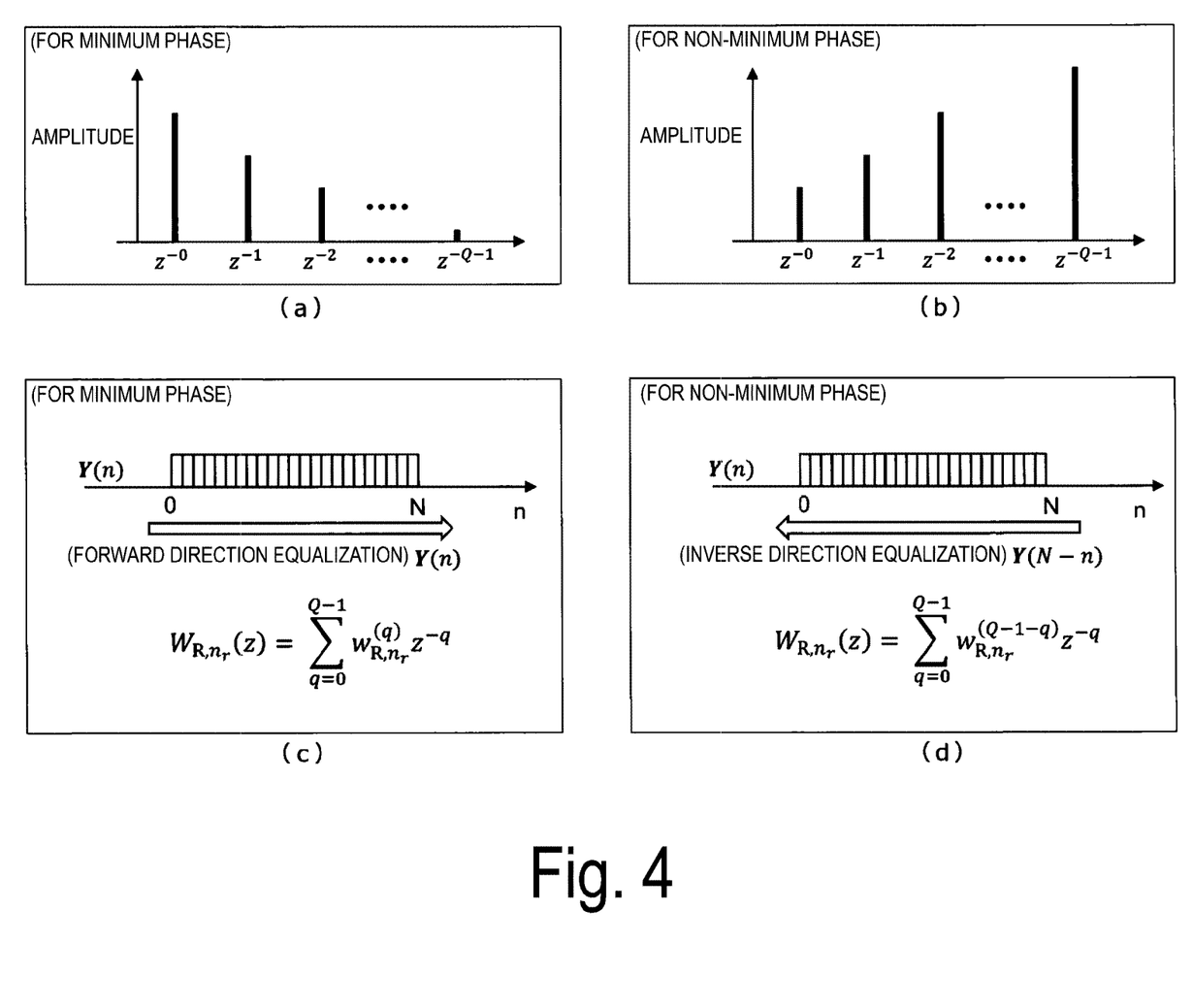
FIG. 4 is a diagram illustrating an example of a direction of an equalization unit.

FIG. 4 illustrates an example of a direction of the equalization unit. Note that FIGS. 4(a) and 4(b) correspond to the impulse response for the minimum phase (FIG. 2(a)) and the impulse response for the non-minimum phase (FIG. 2(b)), as illustrated in FIG. 2. FIG. 4(c) and FIG. 4(d) illustrate the received data signal Y(n) with N samples (N is an integer) in the time direction of the horizontal axis. For the minimum phase illustrated in FIG. 4(c), the reception end linear equalization unit 302 performs the equalization in the forward direction in the time axis direction. In the forward direction equalization, the reception end linear equalization unit 302 operates as an equalization unit according to Equation (7) described above. On the other hand, in the inverse direction equalization, the reception end linear equalization unit 302 operates as an equalization unit according to Equation (18).

[Math. 19]

$$W_{R,n_r}(z) = \sum_{q=0}^{Q-1} w_{R,n_r}^{(Q-1-q)} z^{-q} \quad (18)$$

In Equation (18), the delay tap $Z^{-q}$ is the same as the forward direction equalization of Equation (7), so that the output signal of each delay tap is the same as the forward direction equalization, but the direction of the tap coefficient of the transfer function $W_{R,\,nr}$ is opposite to Equation (7). In the forward direction equalization of Equation (7), the tap coefficient of the delay tap $Z^{-q}$ is $w^{(q)}_{R,\,nr}$, whereas in the inverse direction equalization of Relationship (18), the tap coefficient of the delay tap $Z^{-q}$ is $w^{(Q-1-q)}_{R,\,nr}$. For example, in a case where the number of taps Q=3, the delay taps $Z^{-q}$ include three of $Z^{-0}$ of q=0 to $Z^{-2}$ of q=Q−1=2, so that the tap coefficient of the delay tap $Z^{-1}$ of q=0-th in the forward direction equalization is $w^{(0)}_{R,\,nr}$. The tap coefficient of the delay tap $Z^{-1}$ of q=1st is $w^{(1)}_{R,\,nr}$. The tap coefficient of the delay tap $Z^{-2}$ of q=2nd is $w^{(2)}_{R,\,nr}$. In contrast, in the case of the inverse direction equalization, the tap coefficient of the delay tap $Z^{-0}$ of q=0-th is $w^{(3-1-0)}_{R,\,nr} = w^{(2)}_{R,\,nr}$. The tap coefficient of the delay tap $Z^{-1}$ of q=1st is $w^{(3-1-1)}_{R,\,nr} = w^{(1)}_{R,\,nr}$. The tap coefficient of the delay tap $Z^{-2}$ of q=2nd is $w^{(3-1-2)}_{R,\,nr} = w^{(0)}_{R,\,nr}$. As described above, the order of the tap coefficients of the delay taps $Z^{-q}$ in the inverse direction equalization is the inverse direction of the order of the tap coefficients of the forward direction equalization.

In this manner, the wireless communication system 100 according to the present embodiment determines whether the determinant det (H(z)) of the transfer function matrix H(z) of the CIR is the minimum phase or the non-minimum phase. Then, the wireless communication system 100 controls so as to perform the forward direction equalization in a case where the determinant det (H(z)) is the minimum phase, and perform the inverse direction equalization in a case where the determinant det (H(z)) is the non-minimum phase. Thus, even in the case of the non-minimum phase, the inverse direction equalization is performed, so that it can be calculated as the minimum phase apparently, and the impulse response does not diverge.

First Embodiment

Figure 5:
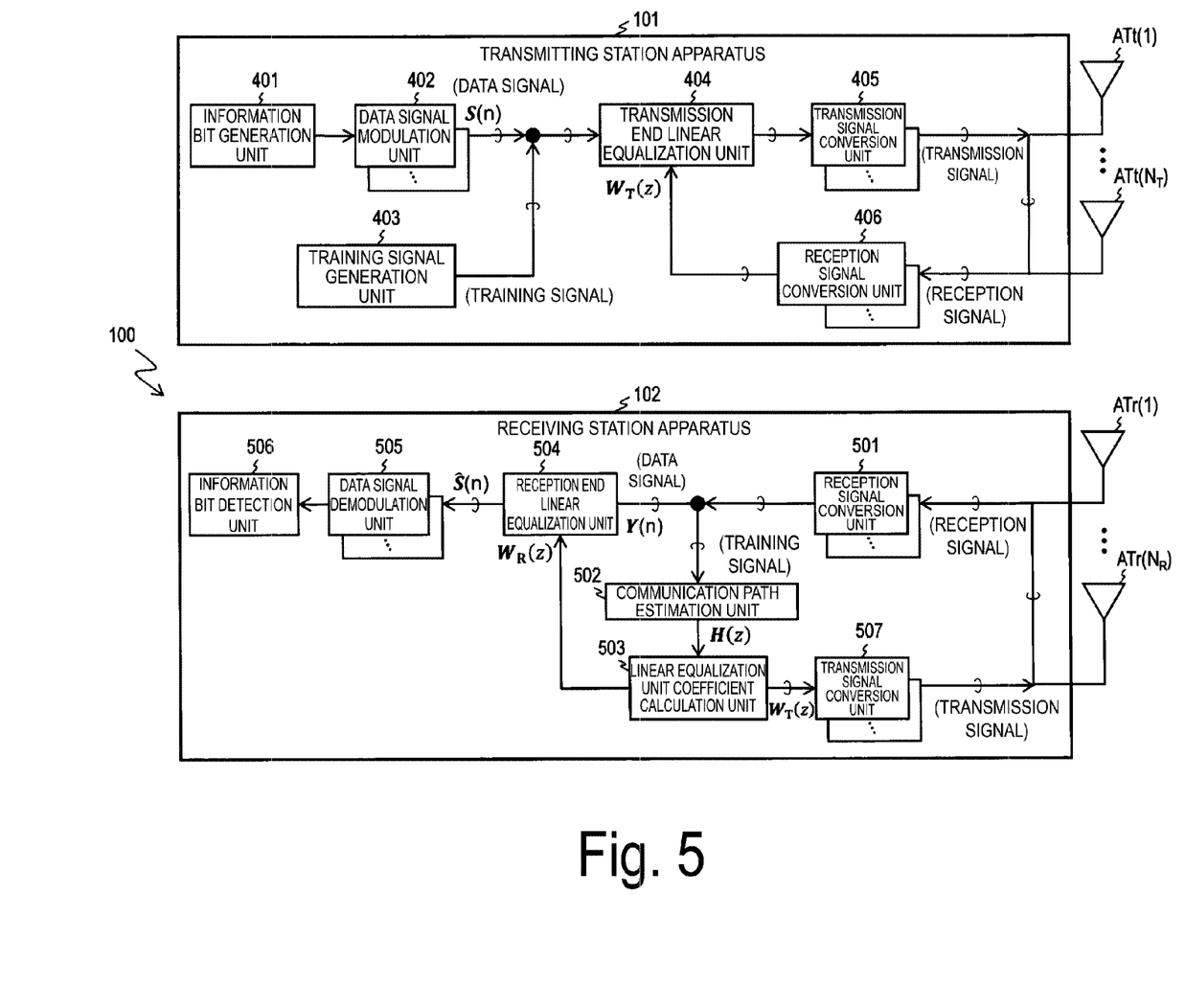
FIG. 5 is a diagram illustrating an example of a transmitting station apparatus and a receiving station apparatus according to the first embodiment.

FIG. 5 illustrates an example of the transmitting station apparatus 101 and the receiving station apparatus 102 according to the first embodiment. Note that FIG. 5 illustrates detailed configuration examples of the transmitting station apparatus 101 and the receiving station apparatus 102 illustrated in FIGS. 1 and 2.

In FIG. 5, the transmitting station apparatus 101 includes an information bit generation unit 401, a data signal modulation unit 402, a training signal generation unit 403, a transmission end linear equalization unit 404, a transmission signal conversion unit 405, a reception signal conversion unit 406, and the $N_T$ antennas of the antenna ATt (1) to the antenna ATt ($N_T$). In FIG. 5, the receiving station apparatus 102 includes the $N_R$ antennas of the antenna ATr (1) to the antenna ATr ($N_R$), reception signal conversion units 501, a communication path estimation unit 502, a linear equalization unit coefficient calculation unit 503, a reception end linear equalization unit 504, data signal demodulation units 505, an information bit detection unit 506, and transmission signal conversion units 507.

First, a configuration of the transmitting station apparatus 101 will be described.

The information bit generation unit 401 generates data information bits to be transmitted to the receiving station apparatus 102. The data information bits are a bit sequence corresponding to, for example, a data signal input from an outside (not illustrated), an internally generated data signal, or the like. Note that the information bit generation unit 401 may have an error correcting coding function of generating an error correcting code at a predetermined coding rate, an interleave function, and the like.

The data signal modulation unit 402 outputs a data signal S(n) obtained by modulating the bit sequence output by the information bit generation unit 401 in a predetermined modulation scheme (for example, quadrature amplitude modulation (QAM)). Note that in the present embodiment, the bit sequence output by the information bit generation unit 401 is divided for a plurality of streams according to the number of antennas ATt, and the data signal S(n) obtained by modulating for each stream is output. Thus, the data signal modulation unit 402 is provided for each stream.

The training signal generation unit 403 generates a training signal for estimating a communication path response (CIR) (corresponding to a training signal generation processing). The training signal is a predetermined signal obtained by modulating predetermined information such as a preamble for signal detection (for example, a specific pattern such as an alternating pattern of "01") in a modulation scheme that is less susceptible to interference, such as phase shift keying (PSK). The training signal is used to estimate a CIR in the receiving station apparatus 102. Note that information on the training signal transmitted by the transmitting station apparatus 101 has been already known to the receiving station apparatus 102.

The transmission end linear equalization unit 404 corresponds to the linear transmission end linear equalization unit 202 illustrated in FIG. 1, and outputs a signal (corresponding to a second data signal) obtained by equalizing the IAI from the data signal S(n) (corresponding to a first data signal) output by the data signal modulation unit 402 to the transmission signal conversion unit 405 (corresponding to the outputting step by the transmitting station apparatus). The transmission end linear equalization unit 404 can be implemented by an equalization unit of a FIR type that has a delay tap holding the data signal output by the data signal modulation unit 402, for example, and shifting the data signal every fixed time, and outputs a sum of signals obtained by multiplying respective delay tap signals by predetermined tap coefficients. Here, the tap coefficients are coefficients constituting the transfer functions for the IAI equalization calculated on the basis of the CIR estimated by the receiving station apparatus 102, and achieves the equalization unit of $W_T(z)$ described in Equation (9). The transmission end linear equalization unit 404 performs the linear equalization processing for the equalization of the IAI. The processing for normalizing the transmission power is also performed simultaneously with the linear equalization processing. Note that the transmission end linear equalization unit 404 outputs the training signal output by the training signal generation unit 403 as it is without performing a linear equalization processing.

The transmission signal conversion unit 405 frequency-converts the data signal or the training signal output by the transmission end linear equalization unit 404 into a high-frequency transmission signal to be transmitted from the antenna ATt. For example, the transmission signal conversion unit 405 up-converts a data signal or a training signal in the 20 MHz band into a high-frequency signal in the 5 GHz band, and transmits the signal from the antenna ATt. Here, streams divided into the plurality of streams are converted into high-frequency signals, and are transmitted from respective antennas of the antenna ATt (1) to the antenna ATt ($N_T$).

The reception signal conversion unit 406 frequency-converts high-frequency reception signals received by the respective antennas of the antenna ATt (1) to the antenna ATt ($N_T$) into low-frequency baseband signals. For example, the reception signal conversion unit 406 down-converts a high-frequency signal in the 5 GHz band and outputs a baseband signal in the 20 MHz band. In the present embodiment, the reception signal conversion unit 406 receives a control signal including information such as a tap coefficient constituting the transfer function used by the transmission end linear equalization unit 202 from the receiving station apparatus 102, converts the reception signal into a baseband signal, and outputs the baseband signal to the transmission end linear equalization unit 404. Note that a function of a demodulation unit that demodulates the information such as a tap coefficient from the baseband signal may be performed by the transmission end linear equalization unit 202, or the reception signal conversion unit 406 may demodulate the information such as the tap coefficient, and may output the result to the transmission end linear equalization unit 404. Here, the transmission signal conversion unit 405 and the reception signal conversion unit 406 correspond to a transmitting station communication unit that performs the transmitting step and the receiving step by the transmitting station apparatus.

The antennas ATt include the $N_T$ transmission and reception antennas of the antenna ATt (1) to the antenna ATt ($N_T$) and emit high-frequency signals output by the transmission signal conversion units 405 as electromagnetic waves to the space. Alternatively, the antennas ATt convert electromagnetic waves in the space transmitted from the receiving station apparatus 102 into high-frequency signals, and output the result to the reception signal conversion units 406.

In this manner, the transmitting station apparatus 101 can transmit the data signals obtained by equalizing the IAI by the transmission end linear equalization unit 202, to the receiving station apparatus 102.

Next, a configuration of the receiving station apparatus 102 illustrated in FIG. 5 will be described.

The antennas ATr include the $N_R$ transmission and reception antennas of the antenna ATr (1) to the antenna ATr ($N_R$) and emit high-frequency signals output by the transmission signal conversion unit 507 described below as electromagnetic waves to the space. Alternatively, the antennas ATr convert electromagnetic waves in the space transmitted from the transmitting station apparatus 101 into high-frequency signals, and output the result to the reception signal conversion units 501 described below.

Similarly to the reception signal conversion unit 406 of the transmitting station apparatus 101, the reception signal conversion unit 501 frequency-converts high-frequency signals received from each of the antenna ATr (1) to the antenna ATr ($N_R$) into baseband signals. Here, the training signal received from the transmitting station apparatus 101 is output to the communication path estimation unit 502, and the data signals received from the transmitting station apparatus 101 are output to the reception end linear equalization unit 504.

The communication path estimation unit 502 estimates the CIR on the basis of the training signal transmitted from the transmitting station apparatus 101 (corresponding to the estimating step by the receiving station apparatus).

The linear equalization unit coefficient calculation unit 503 calculates each of two tap coefficients described below on the basis of the CIR estimated by the communication path estimation unit 502. Here, the first is a tap coefficient constituting the transfer function (corresponding to the transmission end transfer function) for the IAI equalization used by the transmission end linear equalization unit 404 of the transmitting station apparatus 101. The second is a tap coefficient constituting the transfer function (corresponding to the reception end transfer function) for the ISI equalization used by the reception end linear equalization unit 504 of the receiving station apparatus 102. Note that the method for calculating each tap coefficient uses the method described in FIG. 1. Then, the information such as the tap coefficient constituting the transfer function for the IAI equalization calculated by the linear equalization unit coefficient calculation unit 503 is transmitted to the transmitting station apparatus 101 end. Here, the transmission end transfer function uses the adjugate matrix of the transfer function matrix H(z) of the CIR as a transfer function, and the reception end transfer function uses the inverse of the determinant of the transfer function matrix H(z) of the CIR as a transfer function. Note that the linear equalization unit coefficient calculation unit 503 corresponds to the reception end coefficient calculation unit that performs the calculating step by the receiving station apparatus.

The reception end linear equalization unit 504 corresponds to the reception end linear equalization unit 302 described in FIG. 1, and uses the transfer function for the ISI equalization calculated by the linear equalization unit coefficient calculation unit 503 to output the data signal S^(n) (corresponding to a third data signal) obtained by equalizing the ISI from the signal output by each of the reception signal conversion units 501 to the corresponding data signal demodulation unit 505 (corresponding to the outputting step by the receiving station apparatus). Here, as described in FIG. 4, the reception end linear equalization unit 504 determines whether the determinant det (H(z)) of the transfer function matrix H(z) of the CIR is the minimum phase or the non-minimum phase, and controls so as to perform the forward direction equalization in a case where the determinant det (H(z)) is the minimum phase and perform the inverse direction equalization in a case where the determinant det (H(z)) is the non-minimum phase.

The data signal demodulation unit 505 demodulates the data signal S^(n) obtained by equalizing the ISI output by the reception end linear equalization unit 504 to information bits, and outputs a bit sequence. Note that because the reception end linear equalization unit 504 outputs the data signals S^(n) of the plurality of streams according to the number of antennas ATr, the data signal demodulation units 505 demodulate the data signals S^(n) for respective streams. Then, the data signal demodulation units 505 output, to the information bit detection unit 506, a bit sequence obtained by coupling bit sequences that have been divided for the plurality of streams in the transmitting station apparatus 101 end. Note that the data signal demodulation units 505 may include an error correction decoding function or a de-interleave function according to the functions of the transmitting station apparatus 101.

The information bit detection unit 506 outputs reception data obtained by converting the bit sequence output by the data signal demodulation units 505 into digital data. Note that the error correction decoding function and the de-interleave function may be performed in the information bit detection unit 506.

The transmission signal conversion unit 507 converts the information output by the linear equalization unit coefficient calculation unit 503 into high-frequency signals, and transmits the high-frequency signals from the antennas ATt. For example, in the present embodiment, the information such as the tap coefficient constituting the transfer function matrix $W_T(z)$ for the equalization of the IAI calculated by the linear equalization unit coefficient calculation unit 503 is transmitted from the antennas ATr to the transmitting station apparatus 101 end. Note that the function of the modulation unit that modulates the information such as the tap coefficient to a baseband signal may be included in the transmission signal conversion units 507 or the linear equalization unit coefficient calculation unit 503. Here, the reception signal conversion unit 501 and the transmission signal conversion unit 507 correspond to the receiving station communication unit that performs the receiving step and the transmitting step by the receiving station apparatus.

In this manner, the receiving station apparatus 102 can estimate the CIR from the training signal transmitted by the transmitting station apparatus 101, and calculate the tap coefficient constituting the transfer function for the IAI and ISI equalization from the estimated CIR. Then, the tap coefficient for the ISI equalization is set to the reception end linear equalization unit 504, and the tap coefficient for the IAI equalization is transmitted to the transmitting station apparatus 101 and set to the transmission end linear equalization unit 404. Thus, the equalization processing of the IAI can be performed on the transmitting station apparatus 101 end, and the equalization processing of the ISI can be performed on the receiving station apparatus 102 end. In particular, in the present embodiment, as described in FIG. 4, the reception end linear equalization unit 504 determines whether the determinant det (H(z)) of the transfer function matrix H(z) of the CIR is the minimum phase or the non-minimum phase, and controls so as to perform the forward direction equalization in a case where the determinant det (H(z)) is the minimum phase and perform the inverse direction equalization in a case where the determinant det (H(z)) is the non-minimum phase. Thus, even in the case of the non-minimum phase, the inverse direction equalization is performed, so that it can be calculated as the minimum phase apparently, and a stable equalization processing can be achieved without the impulse response diverging.

Second Embodiment

Figure 6:
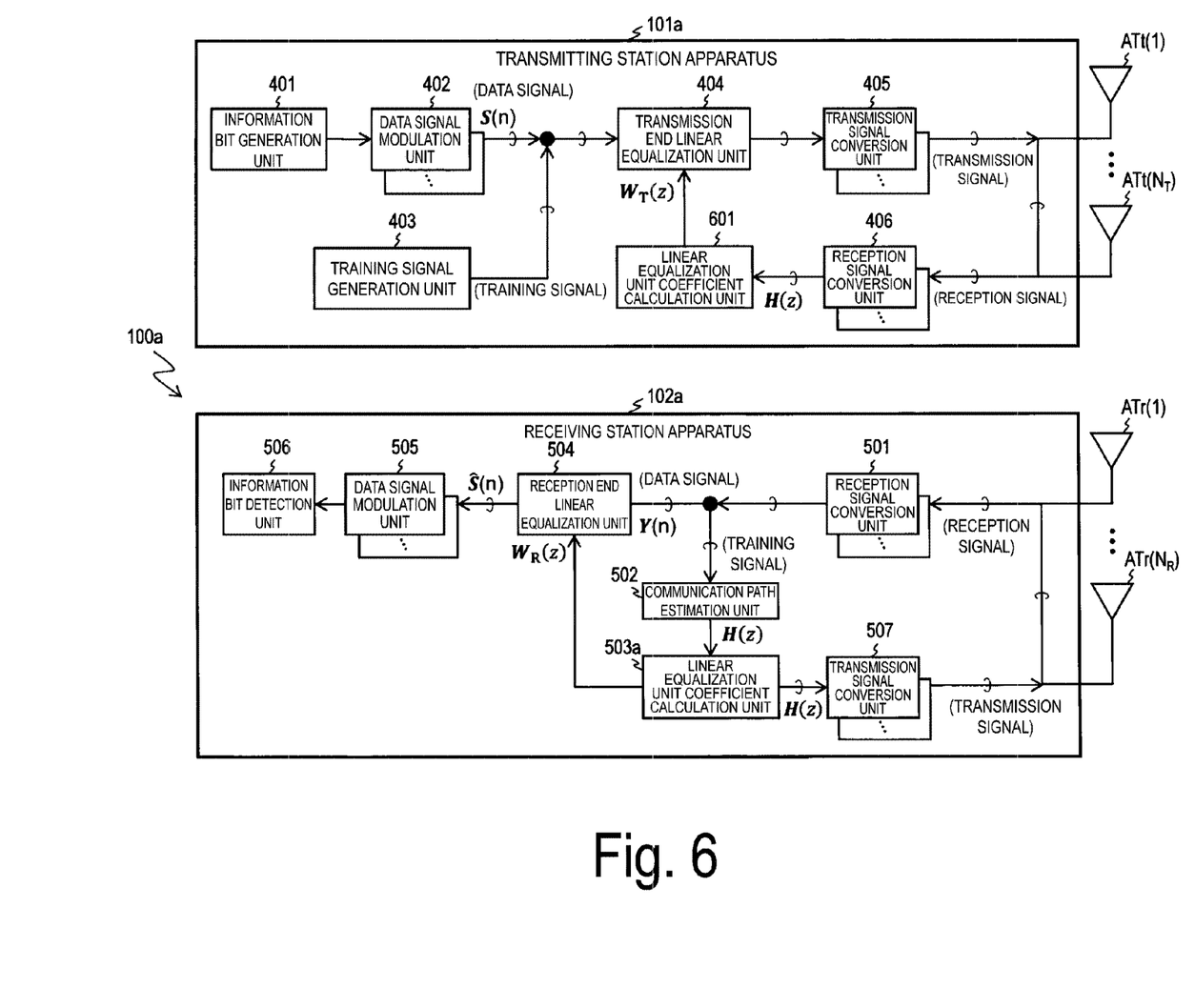
FIG. 6 is a diagram illustrating an example of a transmitting station apparatus and a receiving station apparatus according to the second embodiment.

FIG. 6 illustrates an example of a transmitting station apparatus 101a and a receiving station apparatus 102a according to a second embodiment. Here, the difference between the wireless communication system 100a illustrated in FIG. 6 and the wireless communication system 100 illustrated in FIG. 5 is that the transmitting station apparatus 101a includes a linear equalization unit coefficient calculation unit 601. The processing of the linear equalization unit coefficient calculation unit 503a of the receiving station apparatus 102a is slightly different from the linear equalization unit coefficient calculation unit 503 of the receiving station apparatus 102. Note that in FIG. 6, blocks having the reference signs identical to those in FIG. 5 execute the processing similar to the processing in FIG. 5.

In the receiving station apparatus 102a, a linear equalization unit coefficient calculation unit 503a calculates, on the basis of the CIR estimated by the communication path estimation unit 502, a tap coefficient that constitutes the transfer function for the ISI equalization in the reception end linear equalization unit 504 of the receiving station apparatus 102, as described in FIG. 1. Here, the linear equalization unit coefficient calculation unit 503a transmits information on the CIR estimated by the communication path estimation unit 502 to the transmitting station apparatus 101 without performing a calculation on the tap coefficient that constitutes the transfer function for performing the equalization processing to equalize the TAT in the transmission end linear equalization unit 404 of the transmitting station apparatus 101. Note that the information on the CIR may be transmitted directly from the communication path estimation unit 502, from the antennas ATr to the transmitting station apparatus 101 via the transmission signal conversion units 507.

On the other hand, in the transmitting station apparatus 101a, the linear equalization unit coefficient calculation unit 601 receives the information on the CIR transmitted from the receiving station apparatus 102a. Then, as illustrated in FIG. 1, the linear equalization unit coefficient calculation unit 601 calculates the tap coefficient that constitutes the transfer function for the IAI equalization in the transmission end linear equalization unit 404, and sets the tap coefficient to the transmission end linear equalization unit 404. Here, the linear equalization unit coefficient calculation unit 601 corresponds to the transmission end coefficient calculation unit that performs the calculating step by the transmitting station apparatus.

In this manner, similarly to the wireless communication system 100 of the first embodiment, the wireless communication system 100a according to the present embodiment can estimate the CIR from the training signal transmitted by the transmitting station apparatus 101a. The information on the CIR is transmitted to the transmitting station apparatus 101a end, and the tap coefficient that constitutes the transfer function for the TAT equalization is calculated on the transmitting station apparatus 101a end. As a result, the processing for calculating the tap coefficient of the equalization transfer function is distributed to the transmitting station apparatus 101a end and the receiving station apparatus 102a end, and thus the processing amount of the linear equalization unit coefficient calculation unit 503a can be less than the processing amount of the linear equalization unit coefficient calculation unit 503 of the first embodiment. Here, the linear equalization unit coefficient calculation unit 503a corresponds to the reception end coefficient calculation unit that performs the calculating step by the receiving station apparatus.

Note that, in the wireless communication system 100a according to the present embodiment as well, similarly to the wireless communication system 100 of the first embodiment, the reception end linear equalization unit 504 determines whether the determinant det (H(z)) of the transfer function matrix H(z) of the CIR is the minimum phase or the non-minimum phase, as described in FIG. 4. Then, the reception end linear equalization unit 504 controls so as to perform the forward direction equalization in a case where the determinant det (H(z)) is the minimum phase and perform the inverse direction equalization in a case where the determinant det (H(z)) is the non-minimum phase. Thus, even in the case of the non-minimum phase, the inverse direction equalization is performed, so that it can be calculated as the minimum phase apparently, and a stable equalization processing can be achieved without the impulse response diverging.

As described in each of the embodiments, the wireless communication system, the wireless communication method, the transmitting station apparatus, and the receiving station apparatus according to the present invention enable stable equalization of IAI and ISI even in a case where a part of the transfer functions of the equalization unit is a non-minimum phase in the SC-MIMO transmission according to the method described below. Here, the above-described method is to determine whether the transfer function of the equalization unit is a minimum phase or a non-minimum phase, and change the equalization direction.

REFERENCE SIGNS LIST 100, 100a Wireless communication system
101, 101a Transmitting station apparatus
102, 102a Receiving station apparatus
201 QAM modulation unit
202, 404 Transmission end linear equalization unit
203 RF unit
301 RF unit
302, 504 Reception end linear equalization unit
303 QAM demodulation unit
401 Information bit generation unit
402 Data signal modulation unit
403 Training signal generation unit
405, 507 Transmission signal conversion unit
406, 501 Reception signal conversion unit
ATt, ATr Antenna
502 Communication path estimation unit
503, 503a Linear equalization unit coefficient calculation unit
505 Data signal demodulation unit
506 Information bit detection unit
601 Linear equalization unit coefficient calculation unit

The invention claimed is:

1. A wireless communication system configured to perform SC-MIMO transmission between a transmitting station apparatus and a receiving station apparatus, wherein
the transmitting station apparatus includes
a training signal generation unit configured to generate a training signal that is known, a transmission end linear equalization unit configured to output a plurality of second data signals obtained by equalizing a plurality of first data signals by using a transmission end transfer function, and a transmitting station communication unit including a plurality of antennas configured to transmit the training signal or the plurality of second data signals to the receiving station apparatus and receive information on the transmission end transfer function from the receiving station apparatus, the receiving station apparatus includes a receiving station communication unit including a plurality of antennas configured to receive the plurality of second data signals or the training signal transmitted by the transmitting station apparatus and transmit the information on the transmission end transfer function to the transmitting station apparatus, a communication path estimation unit configured to estimate a communication path response from the training signal received by the receiving station communication unit, a reception end coefficient calculation unit configured to calculate the transmission end transfer function with an adjugate matrix of a transfer function matrix H of the communication path response as a transfer function and a reception end transfer function with an inverse of a determinant of the transfer function matrix H as a transfer function, and a reception end linear equalization unit configured to output a plurality of third data signals obtained by equalizing the plurality of second data signals received by the receiving station communication unit by using the reception end transfer function, and the reception end linear equalization unit determines whether the determinant of the transfer function matrix H is a minimum phase, performs a forward direction equalization in a case of the minimum phase, and performs an inverse direction equalization in a case of a non-minimum phase.

2. The wireless communication system according to claim 1,
wherein the reception end coefficient calculation unit calculates only the reception end transfer function with the inverse of the determinant of the transfer function matrix H as a transfer function, and transmits information on the communication path response to the transmitting station apparatus, and the transmitting station apparatus further includes a transmission end coefficient calculation unit configured to calculate, based on the information on the communication path response received from the receiving station apparatus, the transmission end transfer function with the adjugate matrix of the transfer function matrix H of the communication path response as a transfer function.

3. A wireless communication method for performing SC-MIMO transmission between a transmitting station apparatus and a receiving station apparatus, the wireless communication method comprising the steps of:

by the transmitting station apparatus, generating a training signal that is known;

by the transmitting station apparatus, outputting a plurality of second data signals obtained by equalizing a plurality of first data signals by using a transmission end transfer function;

by the transmitting station apparatus, transmitting the training signal or the plurality of second data signals to the receiving station apparatus and receiving information on the transmission end transfer function from the receiving station apparatus;

by the receiving station apparatus, receiving the plurality of second data signals or the training signal transmitted by the transmitting station apparatus and transmitting the information on the transmission end transfer function to the transmitting station apparatus;

by the receiving station apparatus, estimating a communication path response from the training signal received from the transmitting station apparatus;

by the receiving station apparatus, calculating the transmission end transfer function with an adjugate matrix of a transfer function matrix H of the communication path response as a transfer function and a reception end transfer function with an inverse of a determinant of the transfer function matrix H as a transfer function; and by the receiving station apparatus, outputting a plurality of third data signals obtained by equalizing the plurality of second data signals that are received by using the reception end transfer function, wherein the outputting step by the receiving station apparatus determines whether the determinant of the transfer function matrix H is a minimum phase, performs a forward direction equalization in a case of the minimum phase, and performs an inverse direction equalization in a case of a non-minimum phase.

4. The wireless communication method according to claim 3,
wherein the calculating step by the receiving station apparatus calculates only the reception end transfer function with the inverse of the determinant of the transfer function matrix H as a transfer function, and transmits information on the communication path response to the transmitting station apparatus, and the transmitting station apparatus further performs calculating, based on the information on the communication path response received from the receiving station apparatus, the transmission end transfer function with the adjugate matrix of the transfer function matrix H of the communication path response as a transfer function.

5. A transmitting station apparatus configured to perform SC-MIMO transmission with a receiving station apparatus, the transmitting station apparatus comprising:

a training signal generation unit configured to generate a training signal that is known for the receiving station apparatus to estimate a communication path response;

a transmission end linear equalization unit configured to output a plurality of second data signals obtained by equalizing a plurality of first data signals by using a transmission end transfer function with an adjugate matrix of a transfer function matrix H of the communication path response as a transfer function; and a transmitting station communication unit including a plurality of antennas configured to transmit the training signal or the plurality of second data signals to the receiving station apparatus and receive information on the transmission end transfer function from the receiving station apparatus.

6. The transmitting station apparatus according to claim 5,
wherein the transmitting station apparatus further includes a transmission end coefficient calculation unit configured to calculate, based on the information on the communication path response received from the receiving station apparatus, the transmission end transfer function with the adjugate matrix of the transfer function matrix H of the communication path response as a transfer function.

* * * * *